United States Patent [19]
Ranft et al.

[11] 3,835,646
[45] Sept. 17, 1974

[54] AIR FLOW CONTROL UNIT

[75] Inventors: Ernst L. Ranft, Webster; Gordon R. Paddock; Jeremiah J. Murray, both of Rochester, all of N.Y.

[73] Assignee: General Motors Corporation, Detroit, Mich.

[22] Filed: Oct. 27, 1972

[21] Appl. No.: 301,619

[52] U.S. Cl. ............. 60/290, 137/625.5, 137/454.6, 137/599, 181/33 G, 251/335 A, 251/362
[51] Int. Cl. ...................... F02b 75/10, F16k 51/00
[58] Field of Search ............. 60/289, 290; 161/169; 181/33 G, 33 GA, 36 A; 137/625.5, 599, 454.6; 251/61, 335 R, 335 A, 362

[56] References Cited
UNITED STATES PATENTS

| | | | |
|---|---|---|---|
| 2,754,840 | 7/1956 | Hicks | 137/454.6 |
| 3,326,510 | 6/1967 | Kolze | 137/454.6 |
| 3,467,119 | 9/1969 | Dykzeul | 137/599 |
| 3,484,283 | 12/1969 | Simpson | 161/169 |
| 3,488,250 | 1/1970 | Zocher | 161/169 |
| 3,520,320 | 7/1970 | Grawford | 60/290 |
| 3,538,942 | 11/1970 | Lyall | 137/454.6 |

FOREIGN PATENTS OR APPLICATIONS 944,696  12/1963  Great Britain ...................... 55/524

*Primary Examiner*—Douglas Hart
*Attorney, Agent, or Firm*—C. K. Veenstra

[57] ABSTRACT

In a system for delivering air from an air pump to an exhaust system for an internal combustion engine, an air flow control unit has pressure relief and anti-backfire valves which divert some or all of the air flow away from the exhaust system and instead discharge it directly to the atmosphere. An annular silencing chamber is integrated within the air flow control unit housing and is provided with a needled polyester fiber felt to silence the noise of the diverted air flow.

10 Claims, 5 Drawing Figures

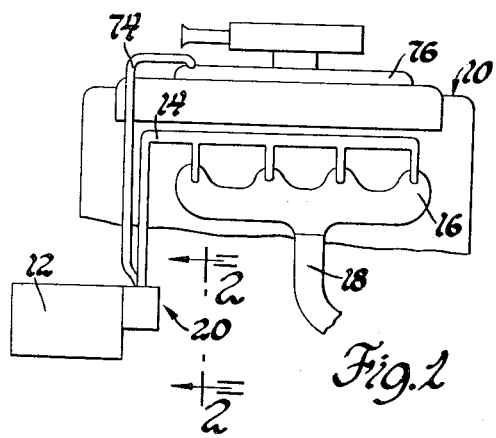
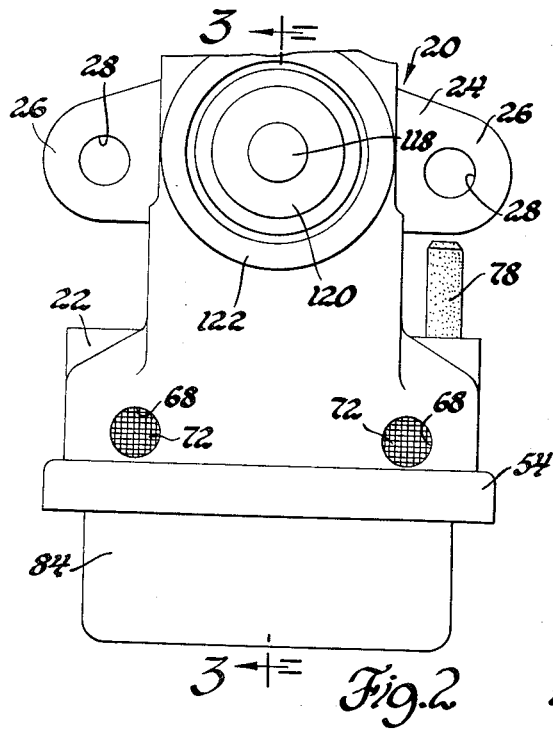
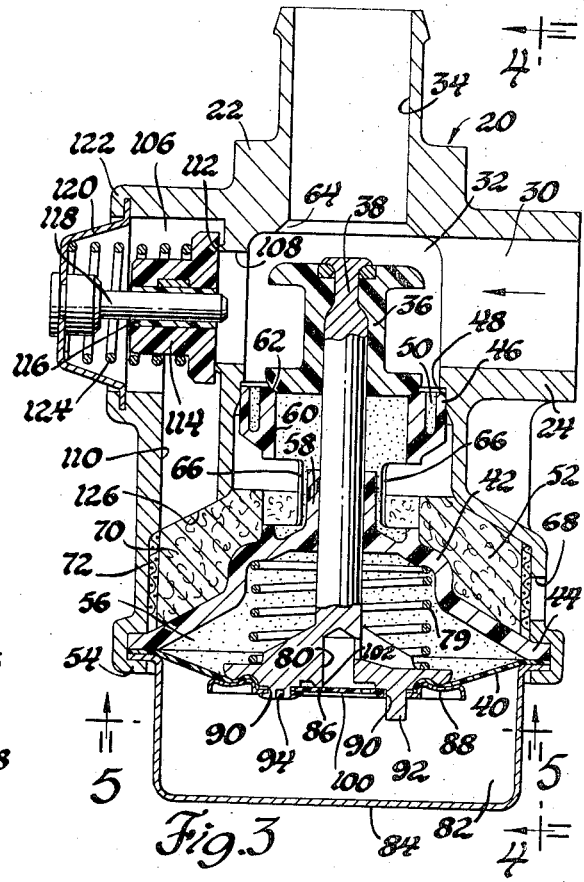
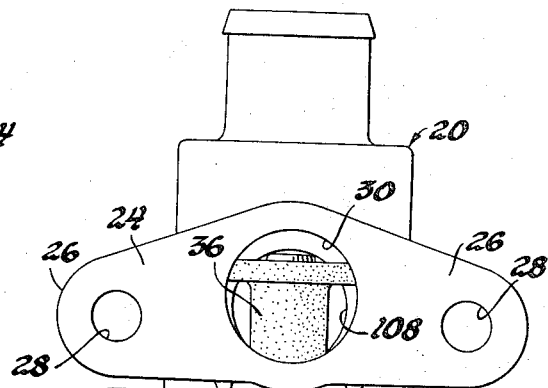
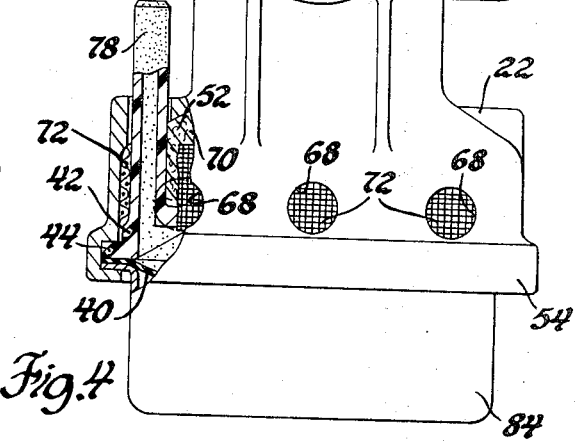
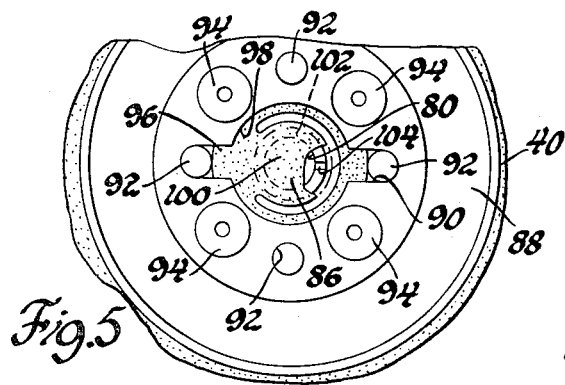

AIR FLOW CONTROL UNIT

This invention relates to an air flow control unit for use in a system for delivering air from an air pump to the exhaust system of an internal combustion engine and more particularly to an air flow control unit which is used to divert some or all of the air flow away from the exhaust system and discharge it directly to the atmosphere.

In the past air flow control units of this nature have been equipped with sheet metal silencing devices which were secured to the outside of the unit. Under some conditions of operation, the silencing device could be subjected to vibrations which could loosen or otherwise damage the silencing device.

This invention provides an air flow control unit in which a silencing chamber is integrated within the unit housing. This construction thereby avoids the chance of damage to the silencing apparatus.

In addition, this invention provides a silencing material which has proven superior in silencing the noise of the diverted air flow in such a system. We have found that the characteristics of a needled polyester fiber felt provide high efficiency in the silencing of such air flow noise.

The details as well as other objects and advantages of this invention are set forth in the remainder of the specification and are shown in the drawings, in which:

FIG. 1 is a schematic view of an internal combustion engine having an air pump for delivering air to the exhaust system and showing this air flow control unit disposed between the pump and the air flow line;

FIG. 2 is an enlarged end elevational view of the air flow control unit, indicated by the line 2—2 of FIG. 1, showing two of the apertures for discharging diverted air from the housing;

FIG. 3 is a side elevational view of the air flow control unit, shown in section taken along line 3—3 of FIG. 2, showing the internal details of construction of the air flow control unit;

FIG. 4 is an end elevational view of the air flow control unit, indicated by the line 4—4 of FIG. 3, showing the remaining three apertures for discharging diverted air from the housing and having parts broken away to show the fitting for supplying the vacuum signal to the diaphragm chamber; and FIG. 5 is a view indicated by the line 5—5 of FIG. 3, further enlarged to show the valve structure included within the diaphragm assembly.

Referring first to FIG. 1, an internal combustion unit 10 has an air pump 12 which supplies air through an air flow line or conduit 14 to the exhaust manifold 16 or to another portion of the exhaust system 18. The air supports combustion of exhaust gas hydrocarbons and carbon monoxide.

An air flow control unit 20 is mounted between pump 12 and flow conduit 14. As may be best seen in FIGS. 2 and 4, the housing 22 of unit 20 has a flange 24 equipped with a pair of ears 26 each including a hole 28 to receive a bolt for securing unit 20 to air pump 12.

Referring now to FIG. 3, housing 22 has a lateral inlet 30 extending to a valve chamber 32. Air is received from air pump 12 through inlet 30 and is discharged through a main outlet 34 to air flow conduit 14.

A valve member 36 is disposed in valve chamber 32 and secured to the upper end of a valve stem 38. The lower end of valve stem 38 is secured to a diaphragm 40 which closes the lower end of housing 22.

A fiberglas reinforced nylon insert member 42 is secured about its lower rim 44 between diaphragm 40 and housing 22. The upper rim 46 of insert 42 is pressed into a bore 48 of housing 22 — a deep groove 50 in rim 46 facilitating the press fit.

The press fit of rim 46 in bore 48 prevents direct leakage of air from valve chamber 32 to the annular chamber 52 defined between insert 42 and housing 22. The lower rim 54 of housing 22 is spun over rim 44 of insert 42 and the peripheral edge of diaphragm 40 to seal a chamber 56, defined between diaphragm 40 and insert 42, from annular chamber 52. A guide portion 58 of insert 42 fits closely about stem 38 both to support and guide stem 38 and to prevent leakage of air from chamber 32 into chamber 56.

Insert 42 has a cylindrical recess 60 surrounding guide portion 58. The upper periphery of recess 60 defines a valve seat 62 which is engaged by the lower portion of valve member 36. When valve stem 38 is displaced upwardly, valve member 36 will be moved away from valve seat 62 and will engage a valve seat 64 surrounding main outlet 34. This will prevent air flow from inlet 30 to main outlet 34 and will divert that air flow into recess 60 from which it passes into annular chamber 52 through a pair of diametrically opposed apertures 66. The air then flows from chamber 52 through five apertures 68 to the atmosphere.

An annular pad of silencing material 70 is disposed in chamber 52 and is surrounded by a ring of screening material 72 to prevent the silencing material 70 from puffing outwardly into apertures 68.

We have found that the noise of air flow diverted from inlet 30 through chamber 52 to the atmosphere is effectively silenced when silencing material 70 comprises a felted polyester fiber having a density in the range of from about .006 to about .007 pounds per cubic inch and which has been needled by passing a plurality of needles through the material in a vertical direction as shown in the drawing.

A vacuum conduit 74 extends from the intake manifold 76 of engine 10 to a vacuum fitting 78 formed as a portion of insert member 42. During engine deceleration, manifold vacuum rises abruptly, and the vacuum in chamber 56 increases correspondingly to raise diaphragm 40 and valve stem 38 against the bias of spring 79. As explained above, this seats valve member 36 against seat 64 to interrupt air flow from pump 12 to exhaust manifold 16 and thus prevent backfiring in the exhaust system.

As shown in FIG. 3, a passage 80 extends through the lower portion of valve stem 38 to connect vacuum chamber 56 with a chamber 82 defined between diaphragm 40 and a lower cup 84. A check valve 86 is disposed in passage 80 to regulate flow from chamber 82 to chamber 56; check valve 86 thus controls the time required to reduce the pressure in chamber 82 to the point where spring 79 will return diaphragm 40, valve stem 38, and valve member 36 to the position shown.

The details of check valve 86 are shown most clearly in FIG. 5. A washer member 88 is disposed under diaphragm 40 and has a plurality of apertures 90 which receive legs 92 formed on the lower portion of valve stem member 38. Four of these legs are riveted, as at 94, to retain washer 88 against valve stem member 38.

The outer rim 96 of check valve member 86 is supported by the inner rim 98 of washer 88. A central flap 100 of check valve 86 overlies an annular valve seat 102 formed at the base of stem member 38. A notch 104 is coined in seat 102. During the period when manifold vacuum in vacuum chamber 56 is increasing, flow from chamber 82 through passage 80 to chamber 56 is restricted to pass through notch 104. Thus, the volume of chamber 82 and the size of notch 104 determine the time required for the pressure in chamber 82 to be reduced to the point where spring 78 will lower diaphragm 40, stem member 38 and valve member 36 to the position shown. During a period of increasing pressure in chamber 56, central flap 100 will be pushed downwardly to allow unrestricted flow from chamber 56 through passage 80 to chamber 82 and thus permit immediate return of diaphragm 40, stem member 38 and valve member 36 to the position shown.

It should be appreciated, of course, that other pressure signals and associated valve mechanisms may be used to operate diaphragm 40, valve stem 38, and valve member 36.

Referring again to FIG. 3, housing 22 has a pressure relief passage 106 extending from a lateral opening 108 disposed in the side of valve chamber 32 diametrically opposite inlet 30. Pressure relief passage 106 includes an axially extending portion 110 which opens into the top of annular silencing chamber 52.

A valve seat 112 is formed about opening 108 and is engaged by an epichlorhydrin valve member 114. Valve member 114 has a nylon sleeve 116 which slides on a shaft 118. Shaft 118 is mounted on a cover member 120 which is secured by a spun over portion 122 of housing 22.

A spring 124 biases valve member 114 against seat 112 until the pressure in valve chamber 32 rises above a selected level. At that level, valve member 114 is displaced from valve seat 112 and a portion of the air flow through inlet 30 is diverted through opening 108 and passage 112 into silencing chamber 52 and through silencing material 70 and housing apertures 68 to the atmosphere.

As may be noted from FIG. 3, housing apertures 68 are disposed at a location axially displaced from insert apertures 66 and from the opening 126 of pressure relief passage 110 in silencing chamber 52; this construction requires that the air flow through silencing material 70 have an axial component as well as a radial component.

It also may be noted that housing apertures 68 have a smaller flow area than insert apertures 66; this imposes a circumferential component on the flow path from insert apertures 66 to housing apertures 68 through silencing material 70.

As may be seen from FIG. 4, the side of housing 22 opposite pressure relief passage 110 has three apertures 68 whereas, as may be seen from FIG. 2, the side of housing 22 containing pressure relief passage 110 has only two apertures 68. Further, the apertures 68 on the side of housing 22 containing pressure relief passage 110 are circumferentially displaced from pressure relief passage 110. This assures that air diverted through pressure relief passage 110 will not channel directly to one of the housing apertures 68.

The embodiments of the invention in which an exclusive property or privilege is claimed are defined as follows:

1. For use with an internal combustion engine having an exhaust system and an air pump for delivering air to said exhaust system, an air flow control unit comprising a housing, a diaphragm closing one end of said housing, a valve stem actuated by said diaphragm and extending from said diaphragm axially into said housing, a valve member secured to said valve stem, said housing defining a valve chamber about said valve member, said chamber having a lateral inlet for receiving air from said pump and a main outlet for discharging air to said exhaust system, said main outlet being axially aligned with said valve stem and having a valve seat formed thereabout for receiving said valve member, an annular insert member disposed between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening from said valve chamber, said recess being aligned coaxially with said valve stem and having a valve seat formed thereabout for receiving said valve member, said insert having a pair of diametrically disposed apertures opening laterally from said recess into said silencing chamber, said housing having a pressure relief passage including a portion opening laterally from said valve chamber and a portion extending axially to said silencing chamber, a pressure relief valve disposed in said pressure relief passage, said laterally opening portion of said pressure relief passage having a pressure relief valve seat formed thereabout for receiving said pressure relief valve, spring means biasing said pressure relief valve into engagement with said pressure relief valve seat, said pressure relief passage and one of said insert apertures discharging into radially aligned portions of said silencing chamber, said housing having two apertures opening from said silencing chamber to the atmosphere on the side of said housing adjacent said one of said insert apertures, said housing apertures being circumferentially spaced one from the other and each from said pressure relief passage, said housing further having three circumferentially spaced apertures opening from said silencing chamber to the atmosphere on the side of said housing adjacent the other of said insert apertures, a felted polyester fiber silencing material disposed in said annular region, said silencing material having been axially needled and having a density in a range of from about .006 to about .007 pounds per cubic inch, whereby said diaphragm may actuate said valve stem to move said valve member from engagement with said insert valve seat into engagement with said main outlet valve seat to thereby divert all air flow from said inlet through said valve chamber into said recess through said insert apertures, said silencing material and said housing apertures and whereby said pressure relief valve member may open against the bias of said spring at a selected pressure to permit air flow from said inlet through said valve chamber, said pressure relief passage, said silencing material and said housing apertures, said housing apertures having smaller air flow areas than said insert apertures and said pressure relief passage and being disposed at an axial position spaced from the axial position of said insert apertures whereby air flow through said silencing material has radial, axial and circumferential components, and an annular screen surrounding said silencing material and covering said housing apertures to prevent said silencing material from extending into said housing apertures.

2. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, a silencing material disposed in said silencing chamber, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere, said housing further defining a pressure relief passage opening laterally from said valve chamber and extending axially to said silencing chamber, and a pressure relief valve member disposed in said pressure relief passage for permitting air flow from said inlet through said valve chamber, said pressure relief passage, said silencing material, and said housing aperture when the pressure in said valve chamber rises above a selected value and for preventing air flow through said pressure relief passage when the pressure in said valve chamber is below said selected value.

3. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, a silencing material disposed in said silencing chamber, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere, said housing further defining a pressure relief passage opening laterally from said valve chamber and extending axially to said silencing chamber, and a pressure relief valve member disposed in said pressure relief passage for permitting air flow from said inlet through said valve chamber, said pressure relief passage, said silencing material, and said housing aperture when the pressure in said valve chamber rises above a selected value and for preventing air flow through said pressure relief passage when the pressure in said valve chamber is below said selected value, said pressure relief passage being circumferentially spaced from said housing aperture whereby air flow from said pressure relief passage through said silencing material to said housing aperture has both axial and circumferential components.

4. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, and a silencing material disposed in said silencing chamber, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere, said insert and housing apertures being disposed at different axial locations whereby air flow from said insert aperture through said silencing material to said housing aperture has both radial and axial components.

5. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having a plurality of circumferentially spaced apertures opening from said silencing chamber to the atmosphere, and a silencing material disposed in said silencing chamber, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere, each of said housing apertures having a smaller air flow area than said insert aperture whereby air flow from said insert aperture through said silencing material to said housing apertures has both radial and circumferential components.

6. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, and a felted polyester fiber silencing material disposed in said silencing chamber, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere.

7. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, and a felted polyester fiber silencing material disposed in said silencing chamber, said material having been needled in an axial direction, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere.

8. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, and a felted fiber silencing material disposed in said silencing chamber, said material having been needled in an axial direction, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere.

9. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, a felted fiber silencing material disposed in said silencing chamber, and screening material disposed between said silencing material and said housing aperture to prevent said fiber from extending into said housing aperture, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere.

10. For use with an internal combustion engine having an exhaust system and an air pump for delivering air to said exhaust system, an air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from said pump and a main outlet for directing air from said valve chamber to said exhaust system, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, and a silencing material disposed in said silencing chamber, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere.

* * * * *

PO-1050
(5/69)

UNITED STATES PATENT OFFICE
CERTIFICATE OF CORRECTION

Patent No. 3,835,646          Dated September 17, 1974

Inventor(s) Ernst L. Ranft, Gordon R. Paddock, Jeremiah J. Murray

It is certified that error appears in the above-identified patent and that said Letters Patent are hereby corrected as shown below:

On the cover sheet, "10 Claims" should be 11 Claims.

In the claims, a claim 11 should be added as follows:

11. An air flow control unit comprising a housing, a diaphragm closing one end of said housing, a valve stem actuated by and extending from said diaphragm axially into said housing, a valve member connected to said valve stem for movement thereby, said housing defining a valve chamber about said valve member, said chamber having an inlet for receiving air from a source of air and a main outlet for directing air from said valve chamber, an annular insert member disposed within said housing between said diaphragm and said valve chamber, said insert member surrounding and guiding said valve stem, said insert member and said housing defining an annular silencing chamber therebetween, said insert member sealing said diaphragm from said valve chamber and said silencing chamber and further sealing said valve chamber from said silencing chamber, said insert member having a cylindrical recess opening to said valve chamber, said recess being aligned coaxially with said valve stem and having a valve seat formed thereabout for receiving said valve member, said insert having at least one aperture opening radially from said recess to said silencing chamber and said housing having at least one aperture opening from said silencing chamber to the atmosphere, and a silencing material disposed in said silencing chamber, whereby said diaphragm may actuate said valve stem to move said valve member into engagement with said insert valve seat to thereby direct air flow from said inlet through said valve chamber to said main outlet and whereby said diaphragm may actuate said valve stem to move said valve member from engagement with said insert valve seat to thereby divert air flow from said inlet through said valve chamber into said recess and through said insert aperture, said silencing material and said housing aperture to the atmosphere.

Signed and sealed this 7th day of January 1975.

(SEAL)
Attest:

McCOY M. GIBSON JR.
Attesting Officer

C. MARSHALL DANN
Commissioner of Patents